Dec. 12, 1939.  E. J. PICKETT  2,183,167
STRAP FERRULE AFFIXING MACHINE
Filed March 29, 1937  2 Sheets-Sheet 1
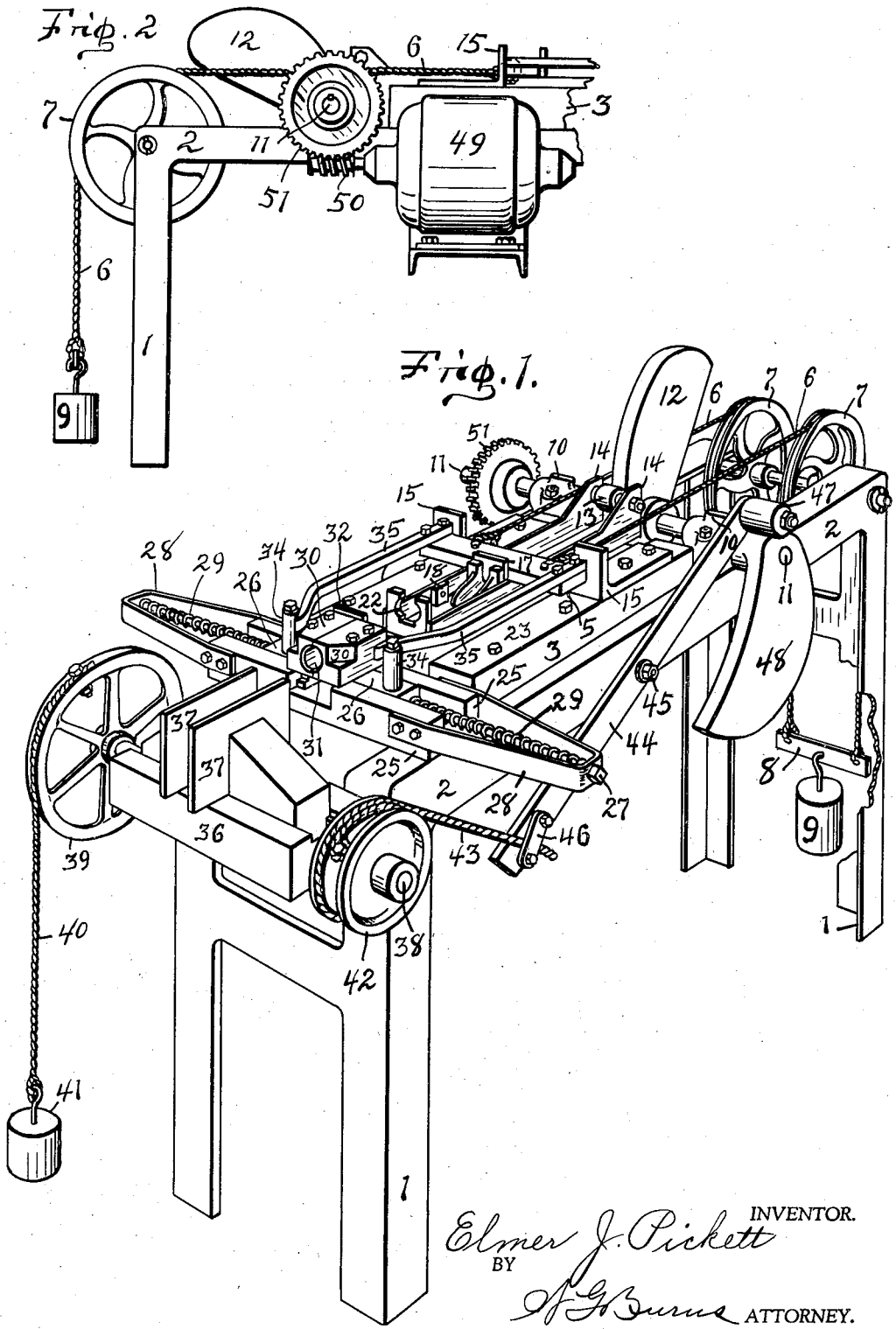
INVENTOR.
Elmer J. Pickett
BY
A. G. Burns ATTORNEY.

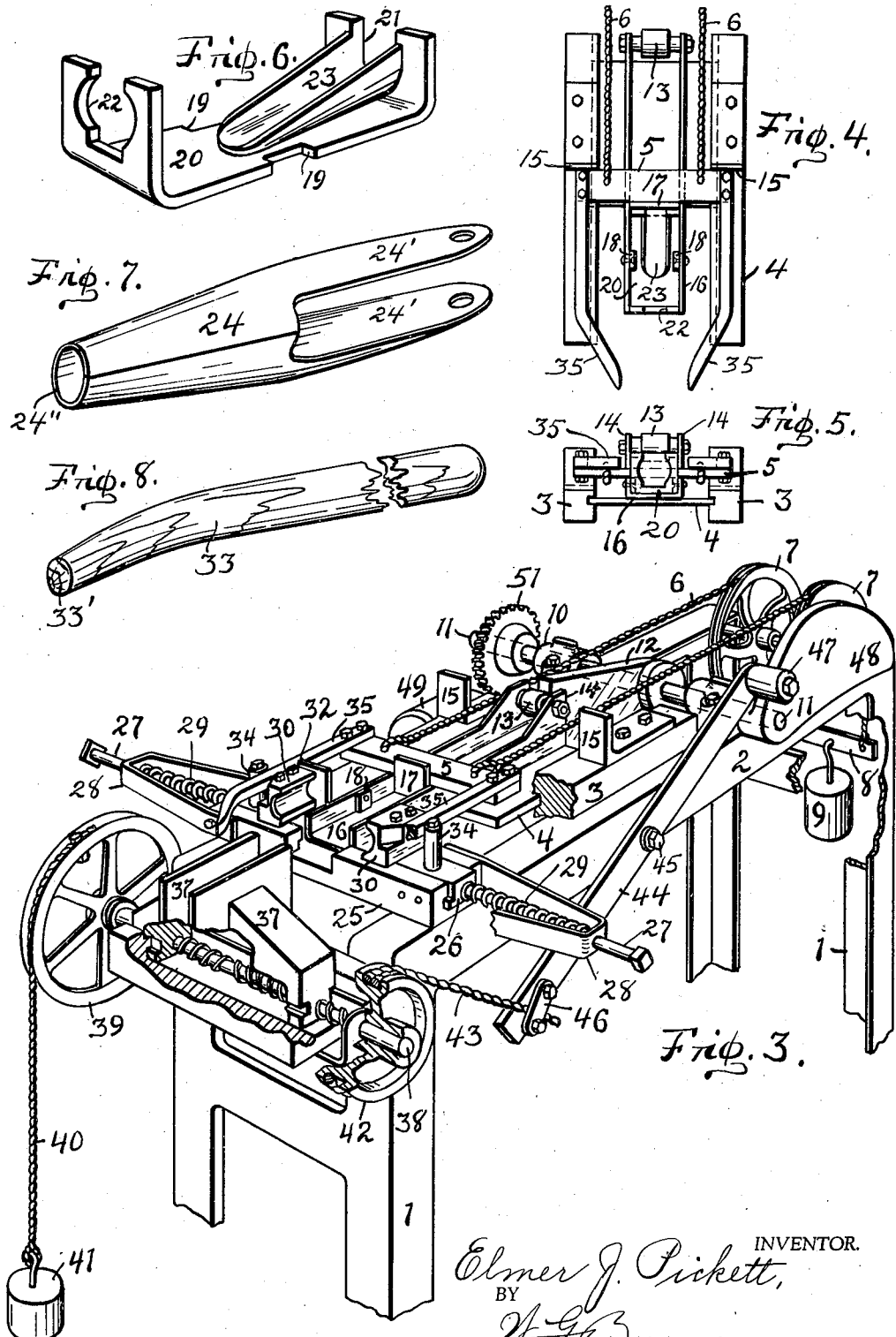

Patented Dec. 12, 1939

2,183,167

UNITED STATES PATENT OFFICE 2,183,167

STRAP FERRULE AFFIXING MACHINE

Elmer J. Pickett, New Haven, Ind.

Application March 29, 1937, Serial No. 133,640

3 Claims. (Cl. 29—84)

This invention relates to improvements in strap ferrule affixing machines, and the object thereof is to provide a power driven machine for expeditiously and accurately placing strap ferrules of metal onto wooden handles ordinarily used in connection with forked and other implements and tools requiring a handle for manipulation.

Another object of the invention is to provide a machine so constituted that the operation of affixing ferrules on handles is carried out in such manner as to insure rapidity and uniformity in the assemblage of the handles and ferrules.

Other objects and advantages of the invention will appear in the following description.

An illustrative embodiment of the invention is shown in the accompanying drawings, in which:

Fig. 1 is a perspective view of an apparatus in which the invention is embodied, portions thereof being broken away;

Fig. 2 is a fragmentary side elevation of the apparatus in which is included the driving motor;

Fig. 3 is another perspective view of the apparatus, portions thereof being broken away and with the operating parts in different positions as compared with Fig. 1;

Fig. 4 is a top plan view of the drive-head;

Fig. 5 is a front end elevation projected from Fig. 4;

Fig. 6 is a perspective view of a cradle for holding the ferrules in position to be applied to the handles;

Fig. 7 is a perspective view showing a strap ferrule of one type to which the machine applies; and Fig. 8 is a fragmentary perspective view of a handle of one type to which the strap ferrule ordinarily is applicable.

The illustrative embodiment of the invention consists of a main frame constituted of legs 1 and horizontal beams 2 connected together. Upon the beams 2 are mounted stationary guides 3 in which is disposed a sliding drive-head 4 arranged for longitudinal movement therein. The drive-head 4 has thereon a cross-beam 5 which has secured thereto cables 6 that extend over corresponding sheave wheels 7 and are connected to an equalizing bar 8 having a weight 9 attached thereto, so that the drive-head is moved rearwardly by gravital force of the weight through the medium of the cables 6.

Upon the beams 2 are positioned bearings 10 in which is mounted a drive-shaft 11 that extends transversely with respect to the frame, and upon said shaft is mounted a cam 12 that revolves therewith and has actuating relation with said drive-head 4, there being a roller 13 rotatively mounted between brackets 14 on said drive-head engaged by said cam 12 so that the drive-head is thereby moved forwardly during rotation of the drive-shaft in opposition to the action of the weight 9 which tends to move the slide rearwardly.

The guide members 3 are surmounted by corresponding stops 15 that by having contact with the cross-beam 5 limits the backward movement of the drive-head at a definite point. The forward movement of the drive-head is dependent upon and limited by the action of the cam 12. By longitudinally adjusting the stops on the guides the stroke of the drive-head may be varied to an extent as required.

The drive-head has at its forward end a channel-shaped cradle holder 16, open at its front end and top, and having at its rear end a butt-plate 17 backed by the cross-beam 5. The side walls of the cradle holder have secured on their inner faces corresponding lugs 18 vertically disposed that are received in notches 19 in the sides of a cradle 20, when the later is removably positioned in the holder 16. Thus, relative longitudinal movement between the cradle and the cradle-holder is prevented.

The cradle 20 is constituted of a casting or other metallic shape formed with the notches 19 in its sides and with openings 21 and 22 respectively in its rear and front upturned ends. Also, there is provided a trough 23 on the cradle extending forwardly from the rear end thereof that constitutes a rest for a ferrule 24 when placed therein. Upon the beams 2 adjacent the front ends of the guide members 3 is secured a handle-centering device constituted of a pair of frame-bars 25 spaced apart, said bars being positioned transversely with respect to the frame beams 2. Between said bars are disposed blocks 26 oppositely disposed and having sliding movement between said bars. Each block 26 has a rod 27 that extends through an outrigger 28 in which it has guided movement, and concentric with each rod is disposed a corresponding compression spring 29, the ends of which bear respectively against the block 26 and the outer end portion of the corresponding outrigger, thus tending to hold the blocks in their innermost positions. The inward stroke of the blocks 26 is limited by contact of the heads on the corresponding rods 27 with the outer ends of the outriggers. Preferably, the rods 27 are threaded in the corresponding blocks 26 so that by adjustably turning the rods 27 the sliding blocks are held spaced apart accordingly. Secured upon the sliding blocks 26 are centering jaws 30 oppositely disposed, their opposing faces being longitudinally grooved so that when the jaws are moved to their innermost positions a guide opening 31 is formed. The jaws are so positioned relative to the drive-head that the guide-opening 31 is axially alined with the opening 22 in the cradle or substantially so. One of the jaws 30 has thereon a stop-plate 32 secured to its rearwardmost end by which is limited movement of the end of a handle 33 at a definite point when the end of the handle is inserted into the opening 31.

Positioned upon the blocks 26 are rollers 34 disposed to rotate upon vertical axes, and said rollers are engaged by corresponding cam arms 35 that are secured to and extend forwardly from the cross-beam 5 on the drive-head. The cam arms, and the rollers engaged thereby, are so arranged that upon forward movement of the drive-head the blocks 26 and the corresponding centering jaws 30 are thereby moved apart in opposition to the pressure of the springs 29. Thus, when the drive-head is in its rearwardmost position, the centering jaws 30 are closed and when the drive-head is thrust to its forward position, the centering jaws are opened.

Upon the forward end of the main frame is mounted an automatically operated vise constituted of a transversely disposed supporting guide 36 having thereon oppositely disposed movable jaws 37 that are operatively related with a right and left hand threaded shaft 38 so that when the shaft is rotated in one direction or the other the vise jaws are moved toward or from each other accordingly. Upon one end of the shaft 38 is secured a sheave-wheel 39 having secured thereon a cable 40 provided with a pendant weight 41 by which said shaft 38 is moved in one direction whereby the vise jaws are caused to move toward each other. Upon the other end of the shaft 38 is secured a drum 42 upon which is wound a cable 43 one end of which has adjustable connection with an operating lever 44 that is pivoted on the main frame as indicated by 45. The cable 43 is secured to the operating lever 44 by means of a clamp-plate 46 which is bolted to one end of said lever. The opposite end of the operating lever 44 has thereon a roller 47 that is engaged by a second cam 48 on the drive-shaft 11 so that as the drive-shaft is rotated the lever 44 is tilted upon its pivotal support 45 causing rotation of the shaft 38 through the medium of the cable 43 and drum 42, the action being in opposition to the force applied to the shaft 38 by the weight 41 through the medium of the cable 40 and sheave-wheel 39. Thus, the jaws 37 of the vise are automatically moved outwardly by action of the cam 48, after which the jaws are moved toward each other through action of the weight 41.

Mounted conveniently upon one side of the main frame is a motor 49 having a worm 50 on its shaft that has engagement with a worm-wheel 51 secured on the drive-shaft 11 whereby the drive-shaft is continuously rotated in one direction to cause proper operation of the cams 12 and 48.

*Operation*

In use, a cradle 20 of selected shape suited to the particular size and form of ferrule to be affixed is positioned in the cradle holder, and the cable 43 is adjusted in its clamped connection with the operating lever 44 acording to the diameter of the handles 33 that are to be secured by the jaws 37. When the various parts of the apparatus are properly adjusted, and are set in operation by turning on the motor, the vise,drive-head and centering jaws are actuated in definite sequence in extent according to adjustment of the parts by the means therefor provided.

While the machine is in operation, after the jaws 37 are opened through action of the cam 48, a handle 33 is, by an operative, introduced between the jaws 37 of the vise with its end 33' extending between the centering jaws 30 which at that time are closed and so as to bear against the stop-plate 32. After the cam 48 has completed its action, releasing the operating lever 44, the shaft 38 is then actuated in the opposite direction by force of the weight 41, causing the vise jaws 37 to grasp the handle previously inserted therebetween. Concurrently, a second operative positions a ferrule 24 in the cradle with its strap ends 24' directed through the opening 22 in the cradle and its opposite end 24" extending through the opening 21 in the cradle and against the butt-plate 17. Following the arrangement of the handle and ferrule in their respective positions, upon further action of the drive-shaft 11 the cam 12 causes forward movement of the drive-head and consequent parting of the centering jaws 30 through the medium of the cam arms 35 while the handle is still fixedly held between the vise jaws, and drives the ferrule onto the adjacent end of the handle. Opening of the centering jaws 30 permits movement of the ferrule into place on the handle end without obstruction while the handle is still secured between the vise jaws. Upon further rotation of the drive-shaft 11 the cam 48 causes re-opening of the vise jaws 37, whereupon the first operative removes the handle with the ferrule fixed thereon.

In this manner the ferrule and the handle are definitely positioned relative to each other so that upon further operation of the machine the ferrule is rammed onto the handle while the handle is firmly held in the vise, after which the handle with the attached ferrule is released from the vise.

The apparatus herein set forth is merely exemplary and departures may readily be made therefrom by those skilled in the art from the precise construction herein set forth. This invention, however, is not confined to the precise means herein illustrated and described by which the operation and method for placing the ferrule on the handle is accomplished.

What I claim is:

1. A machine for affixing a ferrule on a handle, said machine being constituted of a frame upon which is supported a sliding drive-head provided with a butt-plate and cradle holder, a cradle removably disposed in said holder, a mechanism for automatically moving said drive-head to its rearmost position, a handle-centering device having automatically moved jaws shaped to provide, when in operative position, an opening therethrough for a handle, one of said jaws having on its rear end a stop-plate, a vise positioned on said frame ahead of said centering device including mechanism for automatically moving the jaws of said vise toward each other, another mechanism for causing opening movement of said vise, and a power-driven mechanism arranged to cause operation of said drive-head, centering device and vise in a definite sequence of operations.

2. A mechanism for affixing a ferrule on a handle, said machine consisting of a frame, a sliding drive-head disposed on said frame, said drive-head having in connection therewith mechanism for automatically moving same to its rearwardmost position, and having also a butt-plate and a ferrule receiving cradle, a centering device having opposing jaws grooved to afford an opening and having means in connection therewith to normally hold said jaws in closed position, cam arms on said drive-head operatively associated with said centering device for automatically moving said jaws apart upon the forward stroke of said drive-head, a vise positioned on said frame ahead of said centering device including mechanism for automatically moving the jaws of said vise toward each other, and mechanism to cause forward movement of said drive-head and opening movement of said vise in a definite sequence of operations thereof.

3. A machine for affixing ferrules on handles, said machine consisting of a frame, a reciprocating drive-head on said frame provided with a butt-plate and a ferrule holding cradle, and a vise positioned on said frame in front of said drive-head provided with mechanism for automatically moving the jaws of said vise toward each other, and mechanism associated with said drive-head and vise for actuating said drive-head and to cause opening movement of the jaws of said vise.

ELMER J. PICKETT.